United States Patent
Chiu

(10) Patent No.: US 12,271,632 B2
(45) Date of Patent: Apr. 8, 2025

(54) METHOD AND NON-TRANSITORY COMPUTER-READABLE STORAGE MEDIUM AND APPARATUS FOR EXECUTING HOST WRITE COMMANDS

(71) Applicant: Silicon Motion, Inc., Zhubei (TW)

(72) Inventor: Shen-Ting Chiu, Miaoli County (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 18/383,239

(22) Filed: Oct. 24, 2023

(65) Prior Publication Data

US 2024/0201902 A1  Jun. 20, 2024

(30) Foreign Application Priority Data

Dec. 14, 2022  (CN) .......................... 202211598950.X

(51) Int. Cl.
*G06F 3/06* (2006.01)

(52) U.S. Cl.
CPC .......... *G06F 3/0659* (2013.01); *G06F 3/0625* (2013.01); *G06F 3/0679* (2013.01)

(58) Field of Classification Search
CPC ..... G06F 3/0659; G06F 3/0625; G06F 3/0679
See application file for complete search history.

(56) References Cited

U.S. PATENT DOCUMENTS 11,494,106 B2  11/2022 Lee
2017/0177483 A1* 6/2017 Vinod ................. G06F 12/0811

(Continued)

FOREIGN PATENT DOCUMENTS

| CN | 113874826 A | 12/2021 |
|----|-------------|---------|
| TW | 201828307 A | 8/2018  |
| TW | 202134881 A | 9/2021  |

*Primary Examiner* — Eric Cardwell

(74) *Attorney, Agent, or Firm* — Birch, Stewart, Kolasch & Birch, LLP

(57) ABSTRACT

The invention relates to a method, a non-transitory computer-readable storage medium and an apparatus for executing host write commands. The method performed by a processing unit includes: providing a sequential-write command queue (SCQ), a random-write command queue (RCQ) and a mark queue; when a specific condition is met, obtaining a first logical address range carried in the conflicting sequential write command and second logical address ranges carried in the sequential write commands earlier than the conflicting sequential write command from the SCQ, and/or a third logical address range carried in the conflicting random write command and fourth logical address ranges carried in the random write commands earlier than the conflicting random write command from the RCQ according to content of the record; reading user data of the first logical address range from a first address of the RAM and user data of the second logical address ranges from second addresses of the RAM, and/or user data of the third logical address range from a third address of the RAM and user data of the fourth logical address ranges from fourth addresses of the RAM; and programming the user data of the first logical address range and the second logical address ranges, and/or the user data of the third logical address range and the fourth logical address ranges into the flash module.

17 Claims, 13 Drawing Sheets

(56) References Cited

U.S. PATENT DOCUMENTS

2018/0357170 A1* 12/2018 Benisty .............. G06F 12/0855
2020/0393994 A1   12/2020 Subbarao et al.
2021/0248451 A1    8/2021 Rajamani et al.
2022/0057953 A1    2/2022 Lee

* cited by examiner

METHOD AND NON-TRANSITORY COMPUTER-READABLE STORAGE MEDIUM AND APPARATUS FOR EXECUTING HOST WRITE COMMANDS

CROSS-REFERENCE TO RELATED APPLICATIONS

This application claims the benefit of priority to Patent Application No. 202211598950.X, filed in China on Dec. 14, 2022; the entirety of which is incorporated herein by reference for all purposes.

BACKGROUND

The disclosure generally relates to storage devices and, more particularly, to a method, a non-transitory computer-readable storage medium and an apparatus for executing host write commands.

Flash memory devices typically include NOR flash devices and NAND flash devices. NOR flash devices are random access—a host side accessing a NOR flash device can provide the device any address on its address pins and immediately retrieve data stored in that address on the device's data pins NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

In the cache mode, data to be programmed into a flash module may be temporarily stored in a random access memory (RAM) of the flash controller for a time period before an actual programming operation. However, the timing and length of programming temporary data into the flash module would affect the overall system performance. Thus, it is desirable to have a method, a non-transitory computer-readable storage medium and an apparatus for executing host write commands to improve the system performance.

SUMMARY

In an aspect of the invention, an embodiment introduces a method for executing host write commands, performed by a processing unit, to include the following steps: providing a sequential-write command queue (SCQ), a random-write command queue (RCQ) and a mark queue; when a specific condition is met, obtaining a first logical address range carried in the conflicting sequential write command and second logical address ranges carried in the sequential write commands earlier than the conflicting sequential write command from the SCQ, and/or a third logical address range carried in the conflicting random write command and fourth logical address ranges carried in the random write commands earlier than the conflicting random write command from the RCQ according to content of the record; reading user data of the first logical address range from a first address of the RAM and user data of the second logical address ranges from second addresses of the RAM, and/or user data of the third logical address range from a third address of the RAM and user data of the fourth logical address ranges from fourth addresses of the RAM; and programming the user data of the first logical address range and the second logical address ranges, and/or the user data of the third logical address range and the fourth logical address ranges into the flash module.

In another aspect of the invention, an embodiment introduces a non-transitory computer-readable storage medium having stored therein program code that, when loaded and executed by a processing unit, causes the processing unit to perform the method for executing host write commands as described above.

In still another aspect of the invention, an embodiment introduces an apparatus for executing host write commands, to include: a flash interface (I/F); a RAM; and a processing unit, coupled to the RAM and the flash I/F. The RAM is arranged operably to allocate space for an SCQ, a RCQ and a mark queue. The processing unit is arranged operably to: when a specific condition is met, obtain a first logical address range carried in the conflicting sequential write command and second logical address ranges carried in the sequential write commands earlier than the conflicting sequential write command from the SCQ, and/or a third logical address range carried in the conflicting random write command and fourth logical address ranges carried in the random write commands earlier than the conflicting random write command from the RCQ according to content of the record; read user data of the first logical address range from a first address of the RAM and user data of the second logical address ranges from second addresses of the RAM, and/or user data of the third logical address range from a third address of the RAM and user data of the fourth logical address ranges from fourth addresses of the RAM; and drive the flash I/F to program the user data of the first logical address range and the second logical address ranges, and/or the user data of the third logical address range and the fourth logical address ranges into the flash module.

The SCQ stores a plurality of sequential write commands, the RCQ stores a plurality of random write commands and the mark queue comprises a record indicating that a conflicting sequential write command and/or a conflicting random write command needs to be processed in advance.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
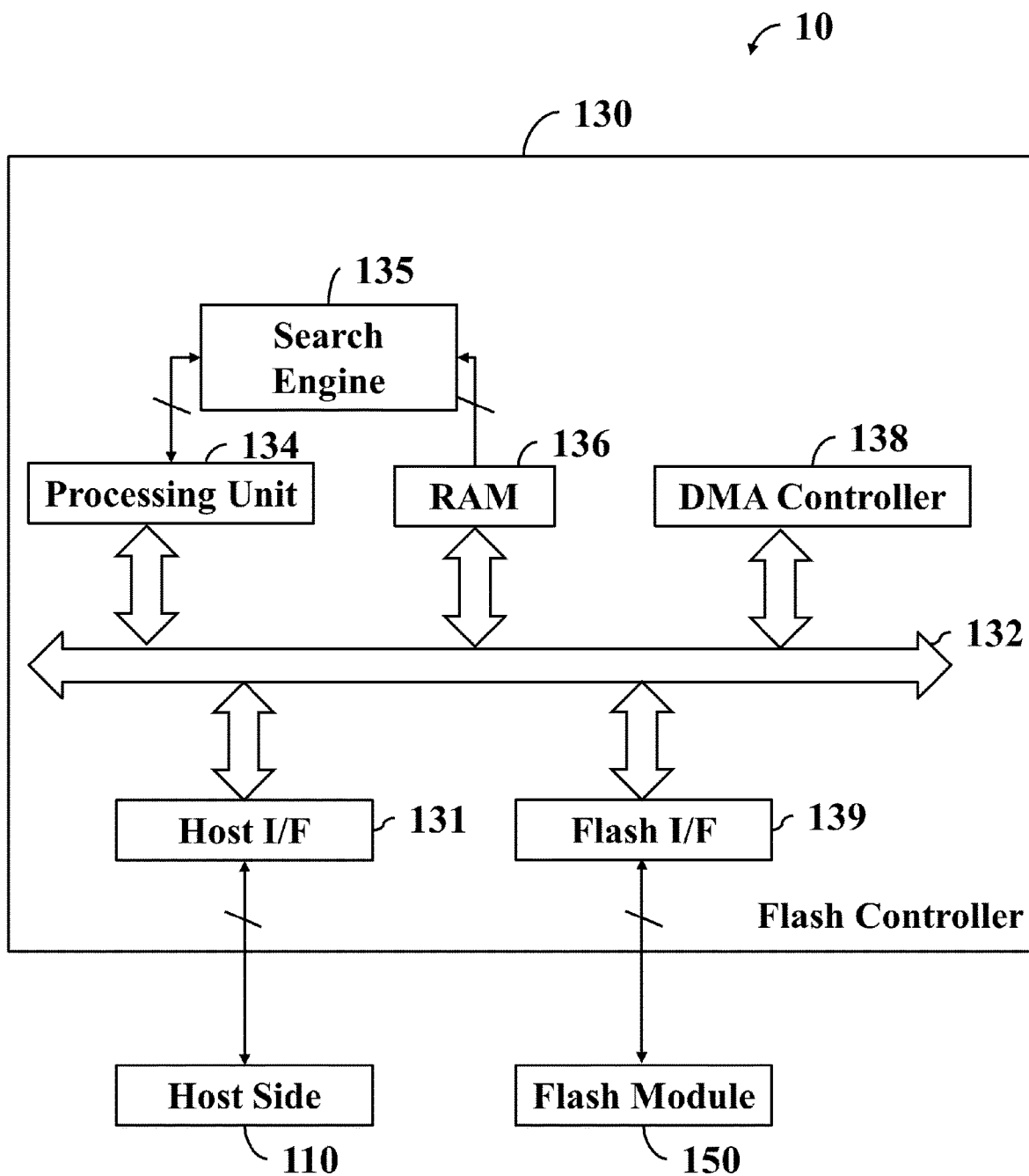
FIG. 1 is the system architecture of an electronic apparatus according to an embodiment of the invention.

Refer to FIG. 1. The electronic apparatus 10 includes the host side 110, the flash controller 130 and the flash module 150, and the flash controller 130 and the flash module 150 may be collectively referred to as a device side. The electronic apparatus 100 may be equipped with a Personal Computer (PC), a laptop PC, a tablet PC, a mobile phone, a digital camera, a digital recorder, a smart television, a smart freezer, an automotive electronics system, or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host I/F 131, such as read commands, write commands, discard commands, erase commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-to-flash (H2F) tables, flash-to-host (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limit to the host I/F 131, the processing unit 134, the RAM 136, the direct memory access (DMA) controller 138 and the flash I/F 139. The DMA controller 138 moves data between the components through the bus architecture 132 according to the instructions issued by the processing unit 134. For example, the DMA controller 138 may migrate data in a specific data buffer of the host I/F 131 or the flash I/F 139 to a specific address of the RAM 136, migrate data in a specific address of the RAM 136 to a specific data buffer of the host I/F 131 or the flash I/F 139, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed, and the control signal lines may be used to transfer control signals, such as Chip Enable (CE), Address Latch Enable (ALE), Command Latch Enable (CLE), Write Enable (WE), etc.

Figure 2:
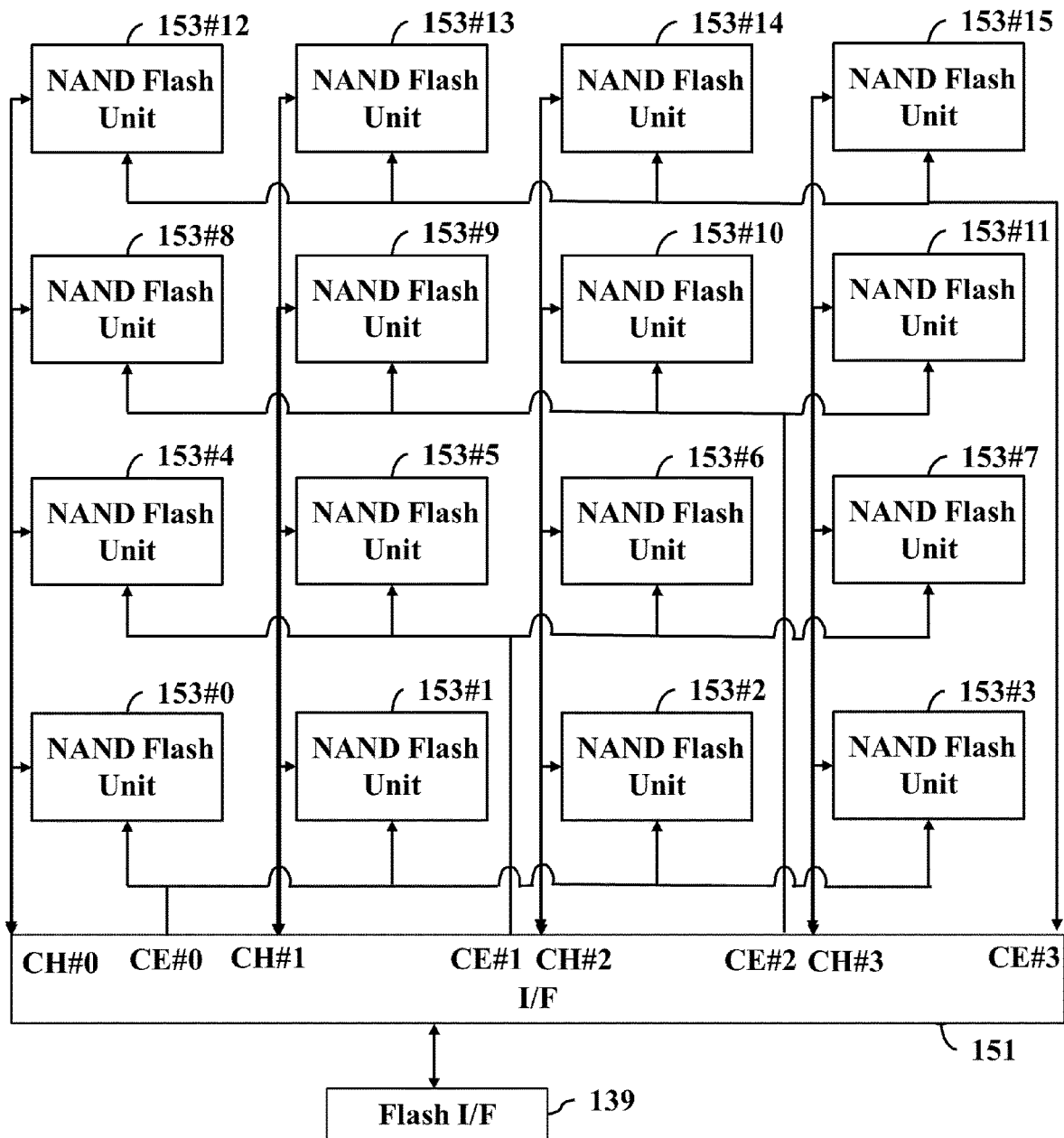
FIG. 2 is a schematic diagram illustrating a flash module according to an embodiment of the invention.

Refer to FIG. 2. The I/F 151 of the flash module 150 may include four I/O channels (hereinafter referred to as channels) CH#0 to CH#3 and each is connected to four NAND flash modules, for example, the channel CH#0 is connected to the NAND flash units 153#0, 153#4, 153#8 and 153#12. Each NAND flash unit can be packaged in an independent die. The flash I/F 139 may issue one of the CE signals CE#0 to CE#3 through the I/F 151 to activate the NAND flash modules 153#0 to 153#3, the NAND flash modules 153#4 to 153#7, the NAND flash modules 153#8 to 153#11, or the NAND flash modules 153#12 to 153#15, and read data from or program data into the activated NAND flash modules in parallel.

In some embodiments, the flash controller 130 can be equipped with the dedicated search engine 135 including digital circuitries, such as registers, comparators, output logics, etc., so that the processing unit 134 drives the search engine 135 to determine whether a logical address range of a host write command conflicts with (or at least partially overlaps with) any logical address range recorded in the sequential-write command queue (SCQ) 310 and the random-write command queue (RCQ) 330. Since the comparisons among logical address ranges require excessive computation times, the processing unit 134 may temporarily leave the execution of the host write command to perform other operations after setting the logical address of the host write command to the input register of the search engine 135. After a predetermined period of time, the processing unit 134 may read values of the output registers of the search engine 135 to determine whether the search has completed and/or whether the input logical address range conflicts with any logical address range recorded in the SCQ 310 and the RCQ 330. If the confliction happens, the processing unit 134 finds the conflicting node in the SCQ 310 or the RCQ 330. In alternative embodiments, the comparisons among logical address ranges may be implemented by search program codes. The processing unit 134 when loading and executing the search program codes performs the aforementioned determinations and outputs the search results.

Figure 3:
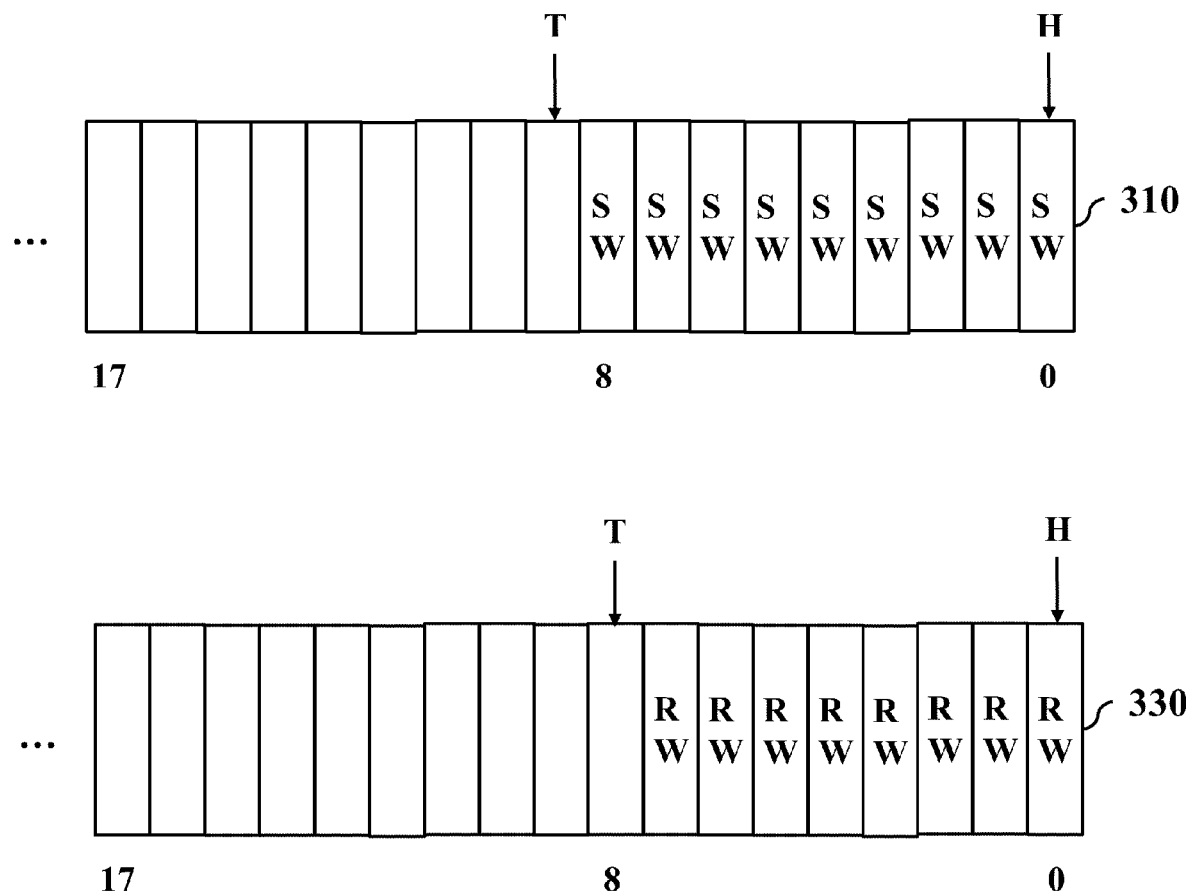
FIG. 3 is a schematic diagram showing the sequential-write command queue and the random-write command queue according to an embodiment of the invention.

Refer to FIG. 3. Space is allocated in the RAM 136 for the SCQ 310, which is used to store sequential write commands sent by the host side 110 according to the time sequence arriving at the flash controller 130. For example, the host write command whose Logical Block Address (LBA) length is greater than 1 is the sequential write command. Further space is allocated in the RAM 136 for the RCQ 330, which is used to store random write commands sent by the host side 110 according to the time sequence arriving at the flash controller 130. For example, the host write command whose LBA length is equal to 1 is the random write command. Any one of the SCQ 310 and the RCQ 330 can store hundreds or thousands of host write commands. The SCQ 310 and the RCQ 330 may be implemented as cyclical queues. The principle operations on the SCQ 310 and the RCQ 330 are the addition of entities to the rear terminal position (for example, the position pointed by a pointer "T"), known as enqueue, and removal of entities from the front terminal position (for example, the position pointed by a pointer "H"), known as dequeue. That is, the first command added to the queue will be the first one to be removed, which conforms to the First-In First-Out (FIFO) principle.

Figure 4:
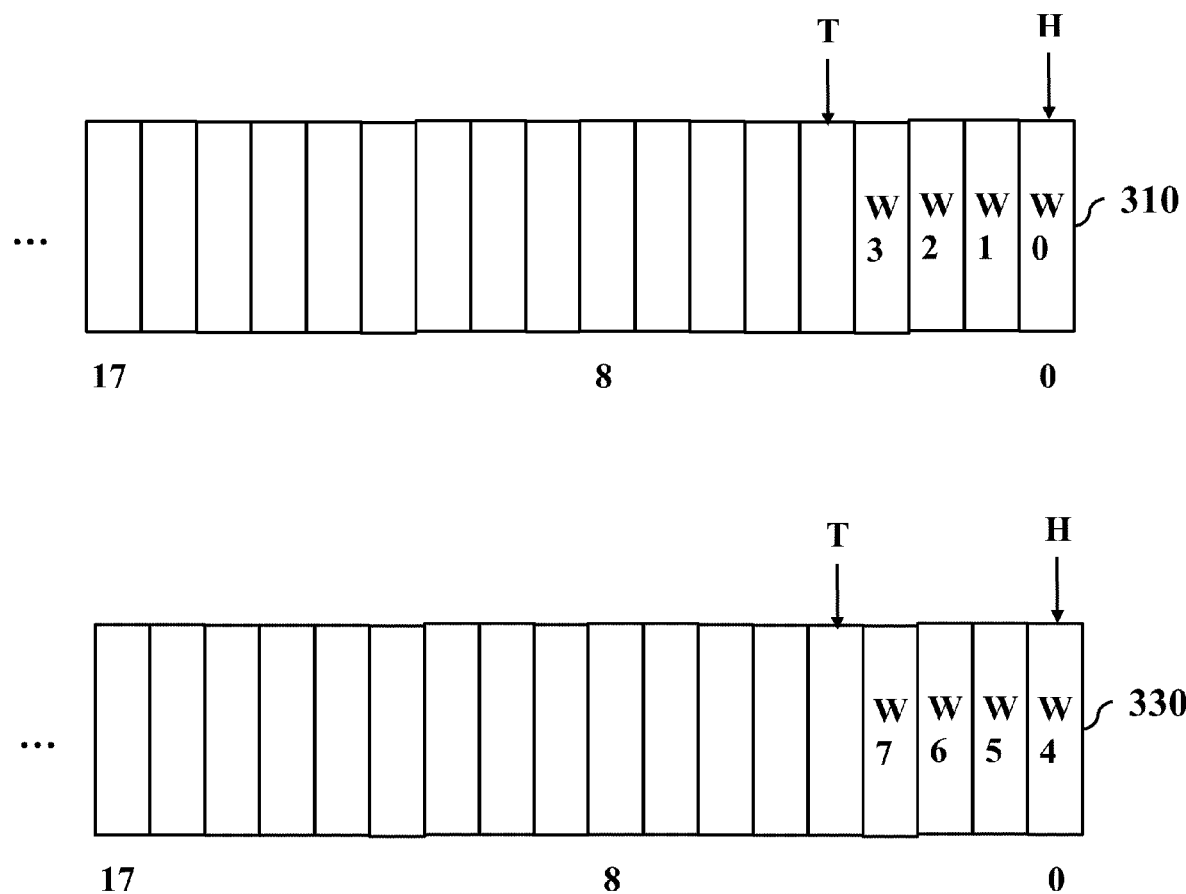
FIG. 4 is a schematic diagram of an initial enqueue result according to an embodiment of the invention.

For example, the processing unit 134 when loading and executing program codes of firmware translation layer (FTL) performs the enqueuing of host write commands: First, eight host write commands are received from the host side 110 through the host I/F 131 sequentially: W0={LBA#0~499,D0}; W1={LBA#1000~1499,D1}; W2={LBA#2000~2499,D2}; W3={LBA#3000~3499,D3}; W4={LBA#500,D4}; WS={LBA#1500,D5}, W6={LBA#2500,D6}; W7={LBA#3500,D7}. The host write command W0 instructs to write the data D0 at the logical addresses LBA#0~499. The host write command W1 instructs to write the data D1 at the logical addresses LBA#1000~1499. The host write command W2 instructs to write the data D2 at the logical addresses LBA#2000~2499. The host write command W3 instructs to write the data D3 at the logical addresses LBA#3000-3499. The host write command W4 instructs to write the data D4 at the logical address LBA#500. The host write command W5 instructs to write the data D5 at the logical address LBA#1500. The host write command W6 instructs to write the data D6 at the logical address LBA#2500. The host write command W7 instructs to write the data D7 at the logical address LBA#3500. Refer to FIG. 4 showing the schematic diagram of the enqueuing results. The FTL pushes the host write commands W0 to W3 (also referred to as sequential write commands) into the SCQ 310 and pushes the host write commands W4 to W7 (also referred to as random write commands) into the RCQ 330.

Figure 5:
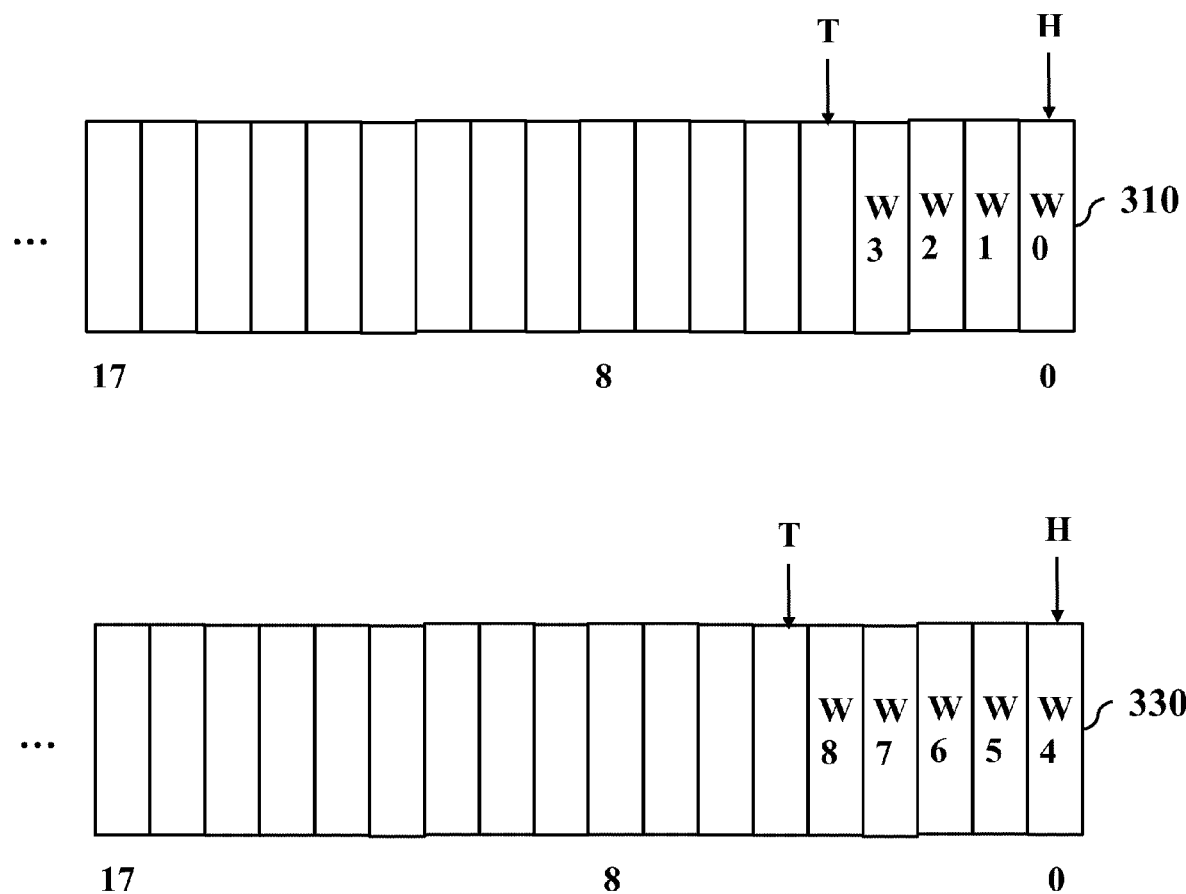
FIG. 5 is a schematic diagram of an intermediate enqueue result according to an embodiment of the invention.

In order to improve the data programming performance of the flash module 130, the processing unit 134 can adopt a specific policy to select one from the sequential write commands and the random write commands to execute. However, the sequence of actual programming data for the host write commands may be different from the arrival sequence of the host write commands issued by the host side 110, resulting in the dirty write. For example, following the example shown in FIG. 4, the FTL receives the host write command W8={LBA#100,D8} to instruct the FTL to write the data D8 at the logical address LBA#100. The enqueuing result for the host write command W8 is shown as FIG. 5. Assume that the flash controller 130 adopt the random-write first principle to remove the host write commands from the SCQ 310 and the RCQ 330: The flash controller 130 executes the host write commands W0 to W3 after the executions of the host write commands W4 to W8. Because the host write command W0 is executed later than the host write command W8, the data at the logical address LBA#10 stored in the flash module 150 is D0, which is not the data D8 expected by the host 110, and the dirty write occurs.

Figure 6:
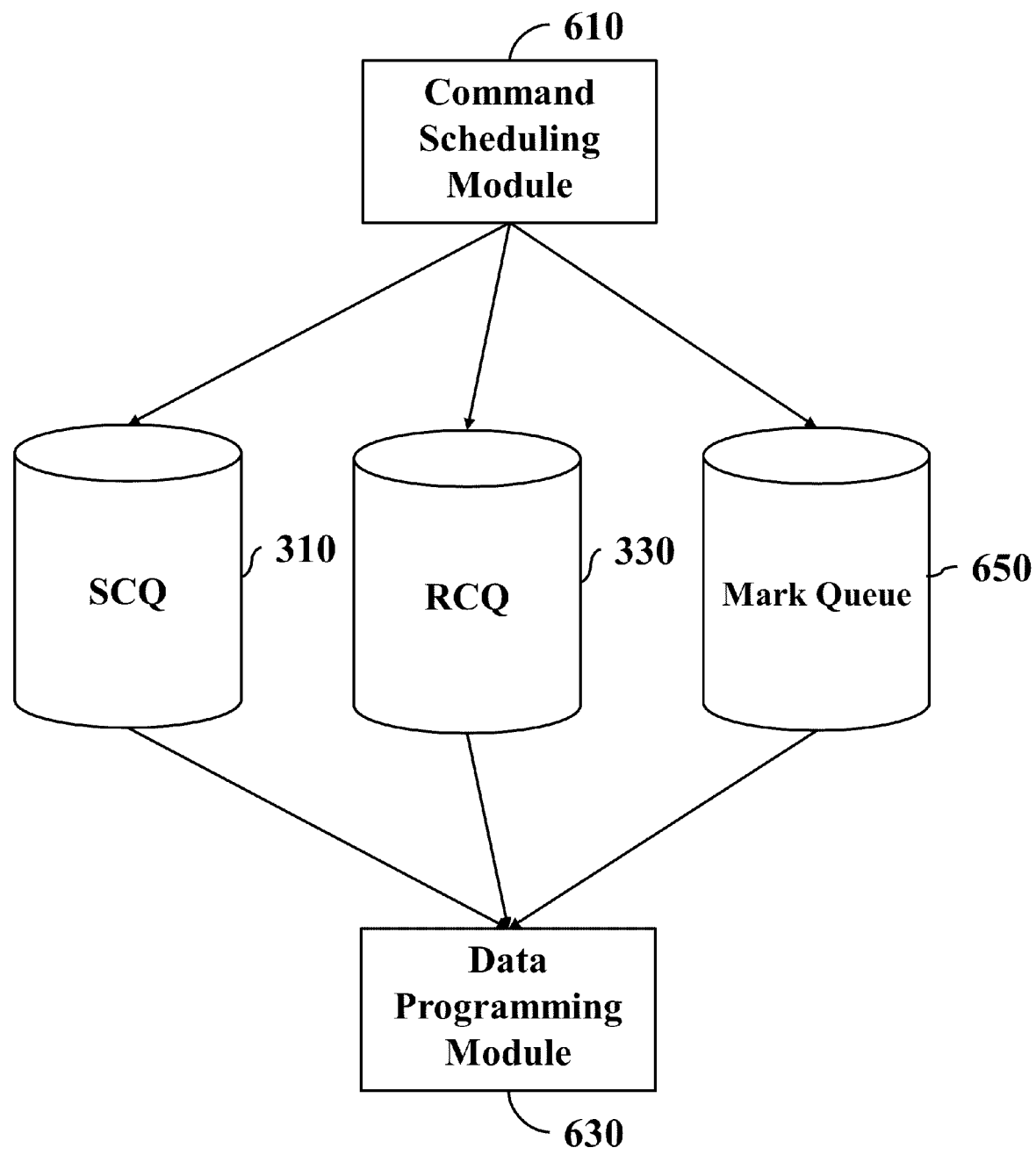
FIG. 6 is a block diagram showing the firmware translation layer (FTL) according to an embodiment of the invention.

Refer to FIG. 6. In order to improve the data programming performance without the dirty write, an embodiment of the invention introduces to set up the command scheduling module 610 and the data programming module 630 that are independently executed in the FTL, and allocate space in the RAM 136 for the mark queue 650.

The command scheduling module 610 includes program codes when being executed by the processing unit 134 to determine whether the logical address range (so-called as the first logical address range) of each host write command received from the host side 110 through the host I/F 131 conflicts with the logical address range (so-called as the second logical address range) carried by at least one sequential write command in the SCQ 310 and/or the logical address range (so-called as the third logical address range) carried by at least one random write command in the RCQ 330. Once a conflict is found, the command scheduling module 610 pushes a record into the mark queue 650 to indicate that the conflicting sequential write command and/or the conflicting random write command requires to be executed earlier than the received host write command. Then, the received host write command is pushed into the SCQ 310 or the RCQ 330 according to the length of the logical address range carried in the received host write command. Therefore, when a certain condition is met, the user data of the logical address range indicated by the conflicting sequential write command and/or the logical address range indicated by the conflicting random write command would be programmed into the flash module 150, which is earlier than the data programming for the received host write command, based on the content of this record in the mark queue 650. Additionally, in order to make the latency of different host commands as consistent as possible and meet the requirements of the specification, the data programming module 630 can control the amount of data programed into the flash module 150 at one time.

The data programming module 630 includes program codes when being executed by the processing unit 134 to obtain the logical address ranges (so-called as first logical address ranges) carried in the conflicting sequential write command and the earlier sequential write commands from the SCQ 310 and/or the logical address ranges (so-called as second logical address ranges) carried in the conflicting random write command and the earlier random write commands from the RCQ 330 according to the content of a record in the mark queue 650; read the user data of the first logical address ranges from the designated address (so-called as the first address) of the RAM 136 and/or read the user data of the second logical address ranges from the designated (so-called as the second address) of the RAM 136; and drive the flash I/F 139 to program the user data of the first logical address ranges and/or the user data of the second logical address ranges into the flash module 150. The data programming module 630 is triggered when a specific condition is met to complete the actual data programming operations.

The mark queue 650 can be implemented as a cyclical queue conforming to the FIFO principle to store multiple records. Each record stores information that the user data associated with all host write commands of the designated node and its earlier nodes in the SCQ 310 or the RCQ 330 requires to be programmed into the flash module 150 in advance.

The trigger condition of the data programming module 630 can be: a time period between the receptions of two instructions from the host side 110, where the first instruction instructs to enter the sleep mode, the power saving mode or the similar mode, and the second instruction instructs to leave the sleep mode, the power saving mode or the similar mode; or the total number of occupied nodes in the SCQ 310, the RCQ 330 or the mark queue 650 exceeds a threshold. The threshold may be set to a percentage of the total number of nodes in the SCQ 310, the RCQ 330 or the mark queue 650, for example, an arbitrary percentage ranging from 60% to 90%.

Figure 7:
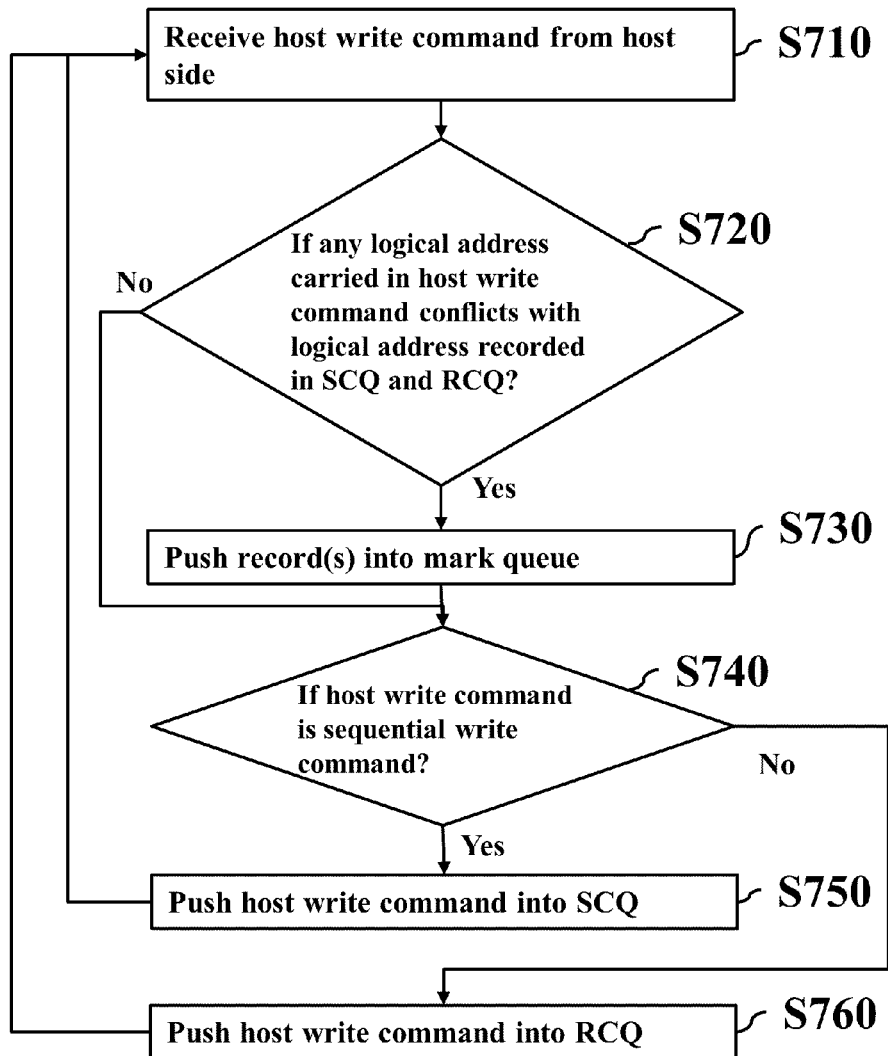
FIG. 7 is a flowchart illustrating a method for executing host write commands according to an embodiment of the invention.

With reference made to the flowchart of executing host write commands as shown in FIG. 7, the method performed by the processing unit 134 when loading and executing the program code of the command scheduling module 610 repeatedly receives host write commands from the host side 110, pushes each host write command into the SCQ 310 or RCQ 330 according to the logical address length of data to be programmed, and, if necessary, pushes a corresponding record into the mark queue 650. The details are as follows:

Step S710: A host write command is received from the host side 110 through the host I/F 131, which includes a start logical address and a length to define a continuous logical address range. Moreover, the command scheduling module receives the user data which this host write command instructs to write, and drives the DMA controller 138 to store the user data in a designated address of the RAM 136.

Step S720: It is determined whether any logical address carried in this host write command conflicts with any logical address recorded in the SCQ 310 and the RCQ 330. If so, the process proceeds to step S730; otherwise, the process proceeds to step S740. The command scheduling module 610 may drive the dedicated search engine 135, or load and execute search program codes to complete the determination.

Step S730: At least one record is pushed into the mark queue 650. The total number of enqueued record(s) is/are equal to the total number of conflicting host write commands in the SCQ 310 and the RCQ 330. Each new record in the mark queue 650 is associated with one conflicting host write command in the SCQ 310 or the RCQ 330. The record(s) is/are enqueued into the mark queue 650 in order from first to last based on the enqueued time of the conflicting host write command.

Step S740: It is determined whether the host write command is a sequential write command according to the length of the logical address range carried in the host write command. For example, if the length is greater than a predefined threshold, then the host write command is determined as a sequential write command and the process proceeds to step S750. If the length is equal to or lower than the predefined threshold, then the host write command is not a sequential write command (i.e. a random write command) and the process proceeds to step S760. In some embodiments, the predefined threshold is set to one.

Step S750: The host write command is pushed into the SCQ 310. In addition to the sequential write command, the designated address of the RAM 136, which stores the user data to be programed that is instructed by the sequential write command, is further recorded in the enqueued node of the SCQ 310.

Step S760: The host write command is pushed into the RCQ 330. In addition to the random write command, the designated address of the RAM 136, which stores the user data to be programed that is instructed by the random write command, is further recorded in the enqueued node of the RCQ 330.

Figure 8:
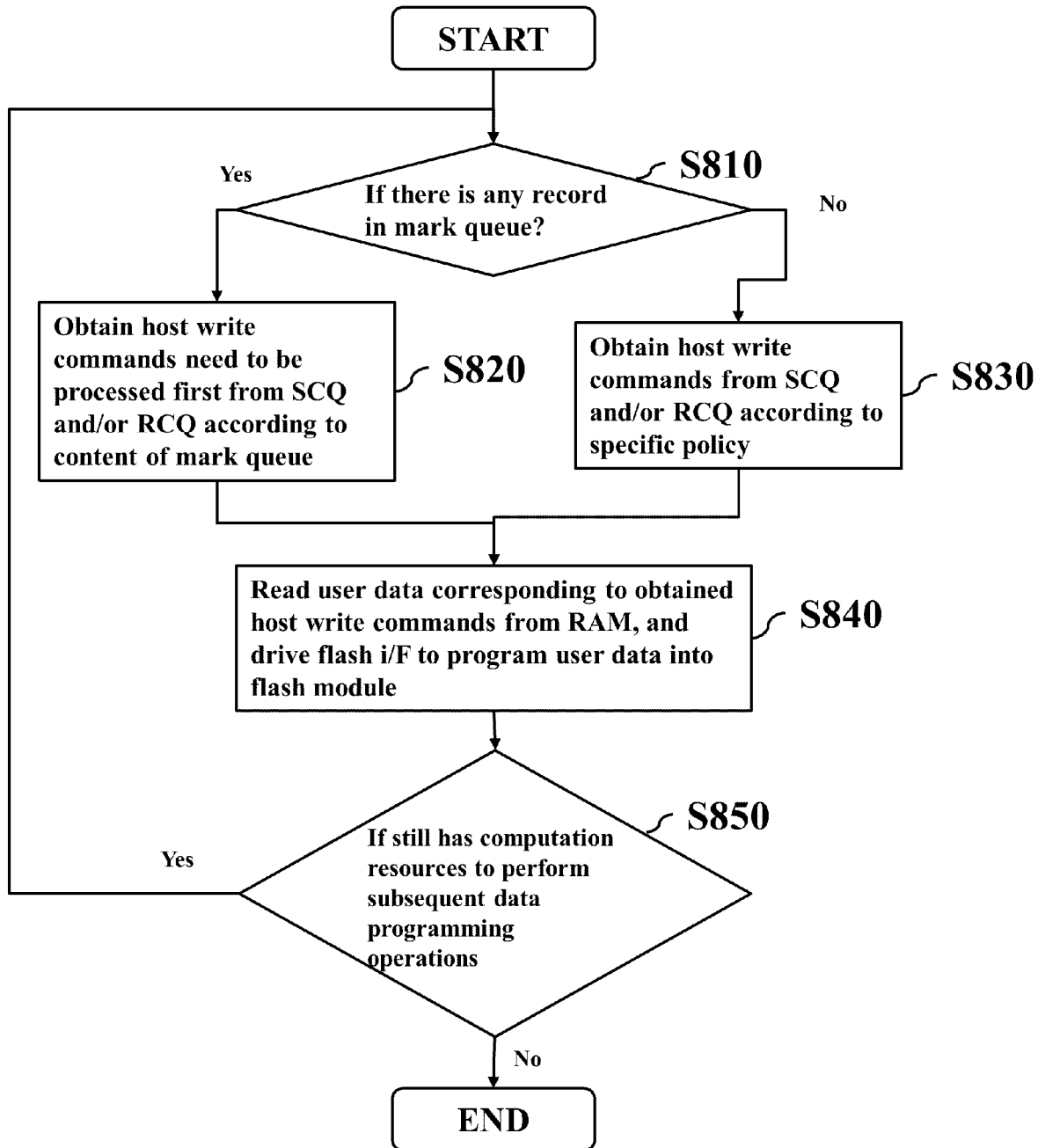
FIG. 8 is a flowchart illustrating a method for programing data instructed by host write commands according to an embodiment of the invention.

With reference made to the flowchart of the method for programming data according to host write commands as shown in FIG. 8, the method performed by the processing unit 134 when loading and executing the program code of the data writing module 630 completes actual data programming operations with references made to the host write commands kept in the SCQ 310 and RCQ 330, and the records kept in the mark queue 650. The details are as follows:

Step S810: It is determined whether there is any record in the mark queue 650. If so, it means that there is at least one host write command that needs to be processed in advance in the SCQ 310 and/or the RCQ 330, and the process proceeds to step S820. Otherwise, it means that no host write command needs to be processed first, and the process proceeds to step S830.

Step S820: One or more host write commands need to be processed in advance are obtained from the SCQ 310 and/or the RCQ 330 with references made to the content of the mark queue 650.

Step S830: One or more host write commands are obtained from the SCQ 310 and/or the RCQ 330 according to a specific policy. The specific policy may refer to, for example, sequential write commands first, random write commands first, arrival time first, or other similar scheduling policies.

Step S840: The user data corresponding to the obtained host write commands is read from designated addresses of the RAM 136 through the DMA controller 138 and the flash I/F 139 is driven to program the user data of the logical address ranges carried in the obtained host write commands into the flash module 150.

Step S850: It is determined whether the flash controller 130 still has computation resources to perform subsequent data programming operations. If so, the process proceeds to step S810; otherwise, the process suspends until the next triggering condition is established. It is determined that the flash controller 130 still has computation resources, for example, when the flash controller 130 has not received an instruction from the host side 110 to instruct the flash controller 130 to leave the sleep mode, the power saving mode or the similar mode, or when no operation with a higher priority than the data programming operation is waiting for execution by the flash controller 130.

Figure 9:
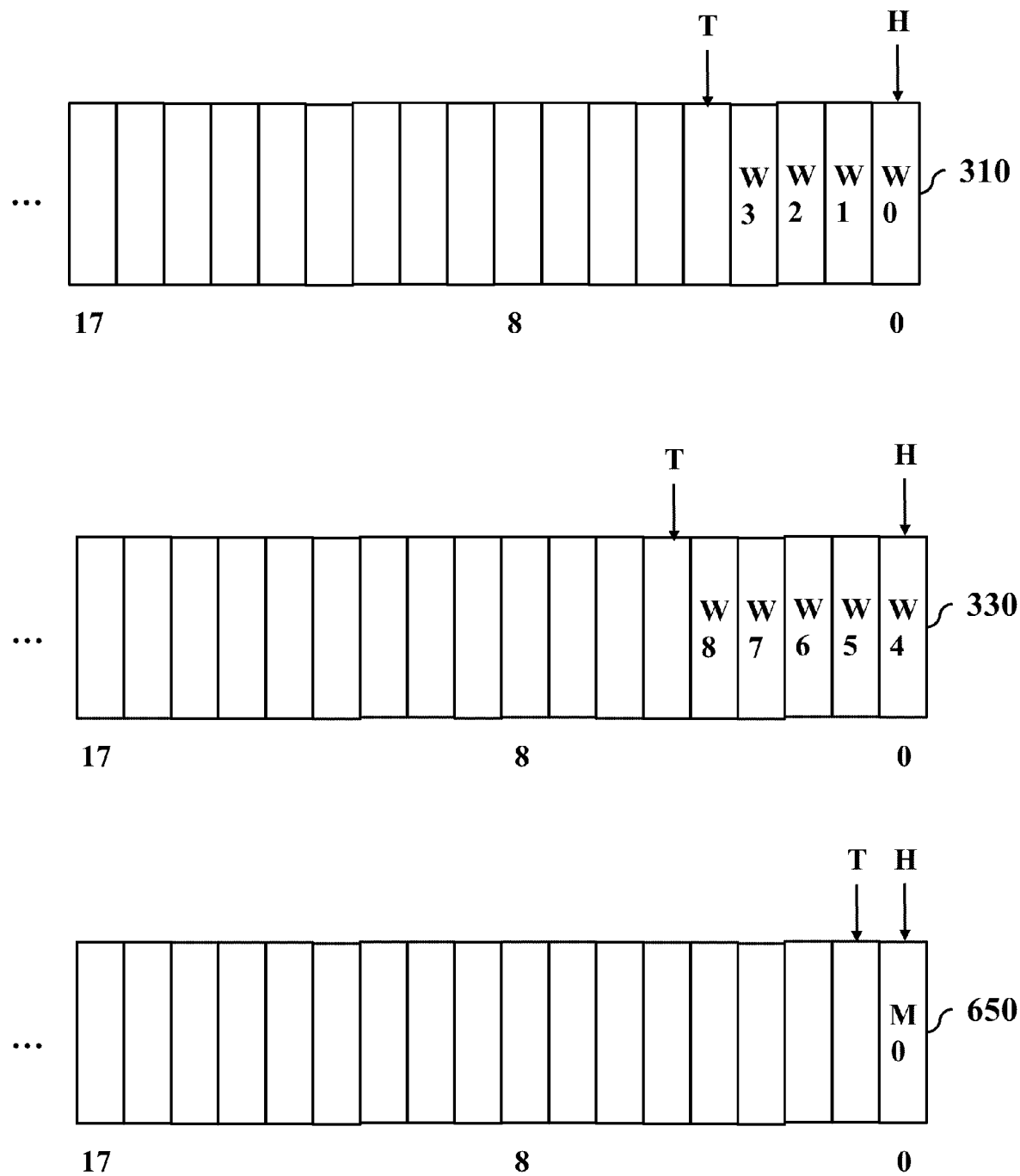
FIGS. 9 to 13 are schematic diagrams of intermediate enqueue results according to embodiments of the invention.

More use cases are described below to illustrate the operations of the methods shown in FIGS. 7 and 8: Following the example as shown in FIG. 4, after receiving the host write command W8 (step S710), the command scheduling module 610 detects that the logical address LBA#100 carried in the host write command W8 conflicts with the logical address range LBA#0~499 carried in the host write command W0 in the 0$^{th}$ node of the SCQ 310 (the "Yes" path of the step S720), pushes the record M0=Q0[0] into the mark queue 650, where Q0[0] represents the 0$^{th}$ node of the SCQ 310 (step S730), and pushes the host write command W8 into the RCQ 330 (step S760). The content of the queues after the execution are shown in FIG. 9.

Figure 10:
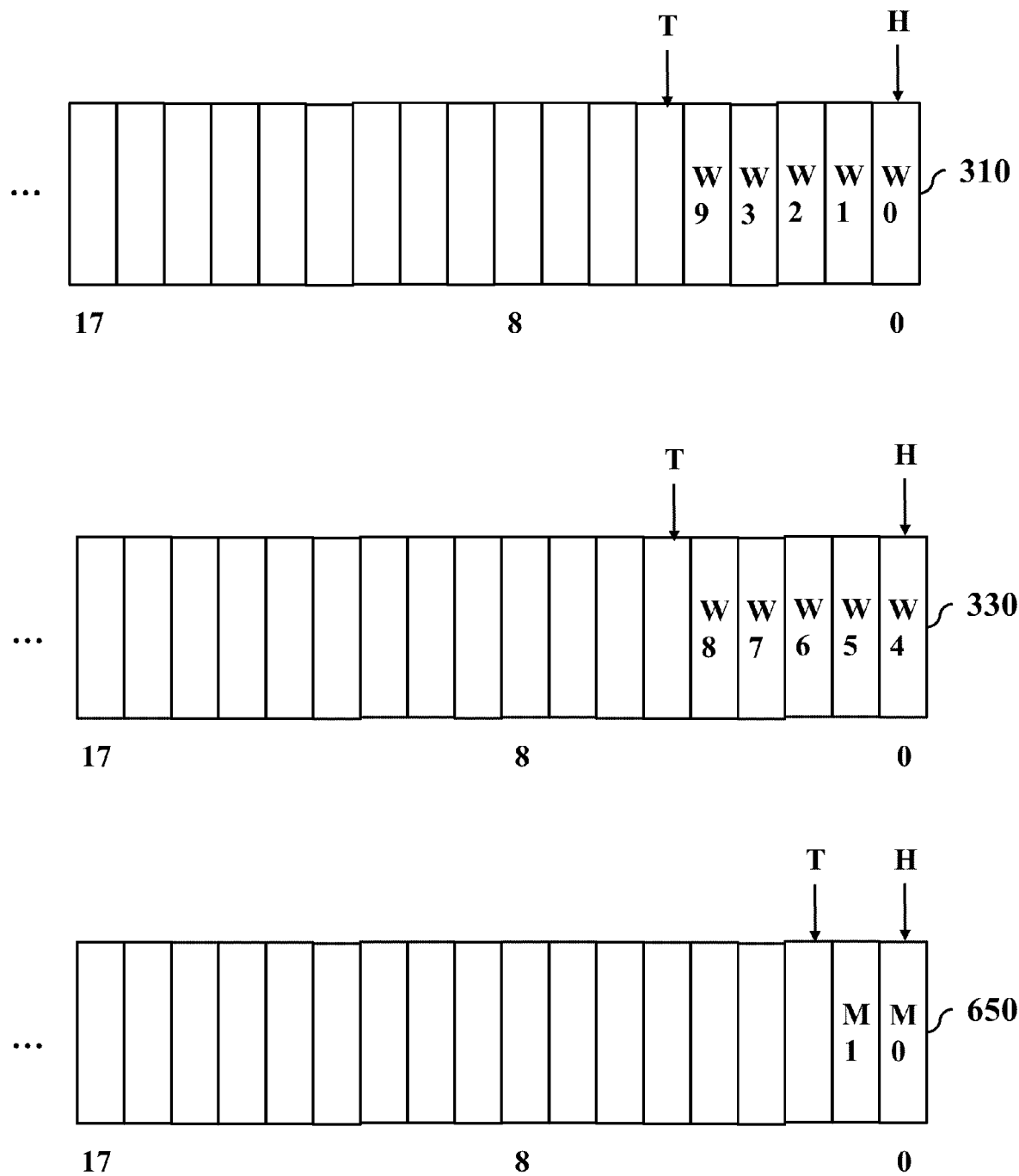

Subsequently, after receiving the host write command W9={LBA#1200~1299,D9} (step S710), the command scheduling module 610 detects that the logical address LBA#1200~1299 carried in the host write command W9 conflicts with the logical address range LBA#1000~1499 carried in the host write command W1 in the 1$^{st}$ node of the SCQ 310 (the "Yes" path of the step S720), pushes the record M1=Q0[1] into the mark queue 650, where Q0[1] represents the 1$^{st}$ node of the SCQ 310 (step S730), and pushes the host write command W9 into the SCQ 310 (step S750). The content of the queues after the execution are shown in FIG. 10.

Figure 11:
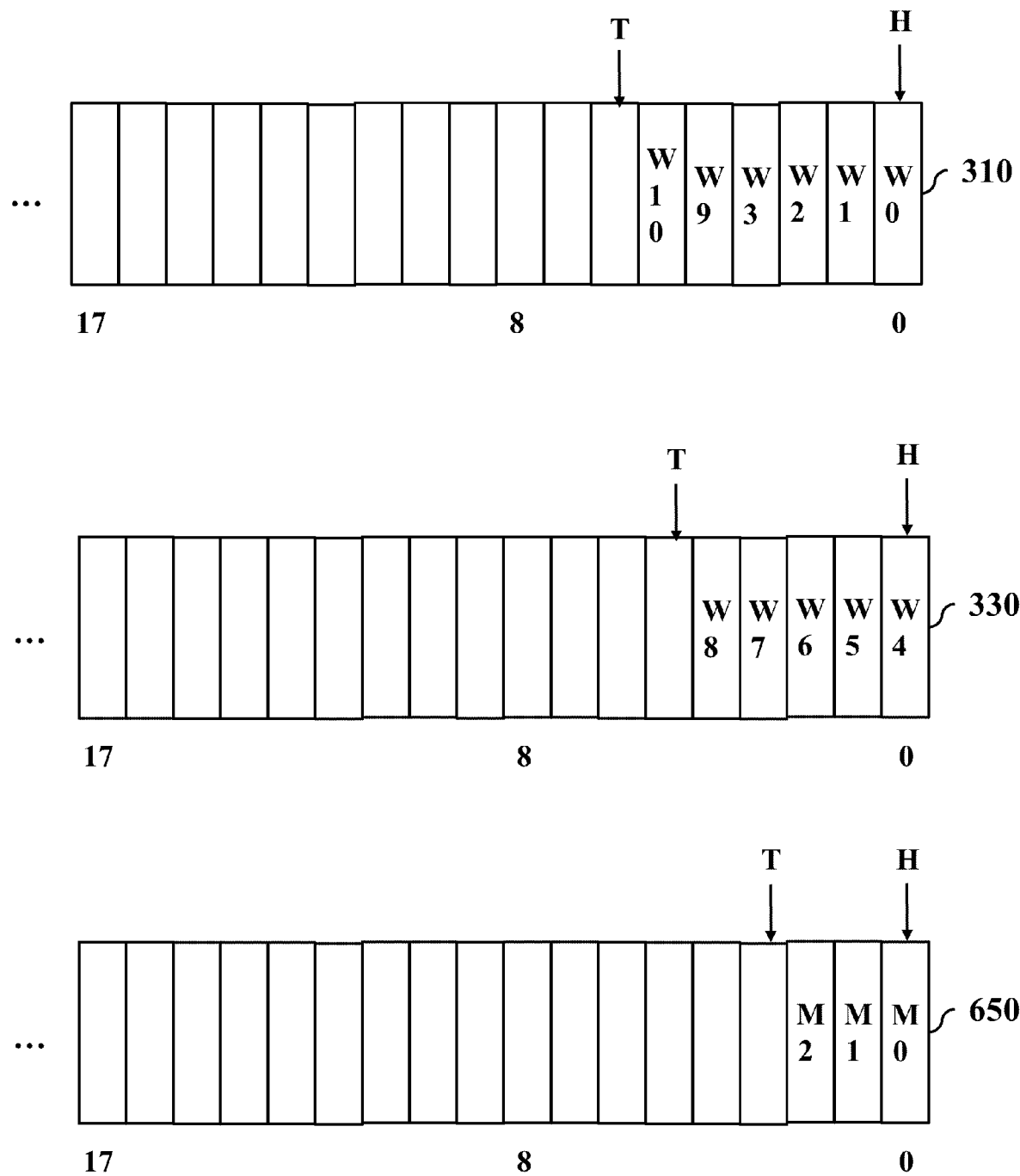

Subsequently, after receiving the host write command W10={LBA#2300~2799,D10} (step S710), the command scheduling module 610 detects that the logical address range LBA#2300~2799 carried in the host write command W10 conflicts with the logical address range LBA#2000~2499 carried in the host write command W2 in the 2$^{nd}$ node of the SCQ 310 and the logical address LBA#2500 carried in the host write command W6 in the 2$^{nd}$ node of the RCQ 330 (the "Yes" path of the step S720), pushes the record M2=Q0[2]+Q1[2] into the mark queue 650, where Q0[2] represents the 2$^{nd}$ node of the SCQ 310 and Q1[2] represents the 2$^{nd}$ node in the RCQ 330 (step S730), and pushes the host write command W10 into the SCQ 310 (step S750). The content of the queues after the execution are shown in FIG. 11.

Figure 12:
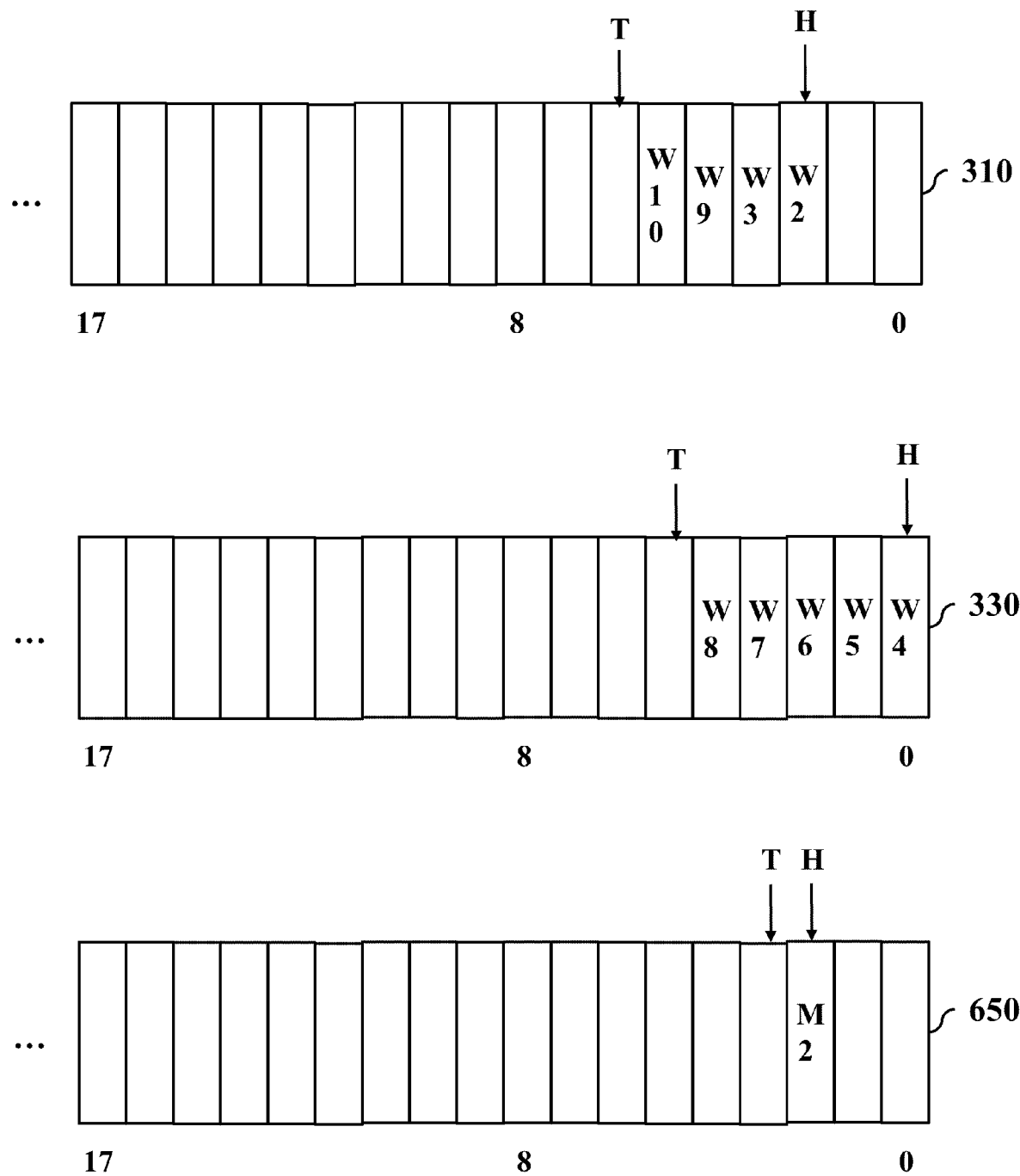

Subsequently, assuming that the condition for triggering the data programming operation is met, the data programming module 630 discovers any record stored in the mark queue 650 (the "Yes" path of step S810), pops the host write commands W0 and W1 out of the SCQ 310, which need to be programmed in advance indicated by the top two records in the mark queue 650, according to the preset maximum write data amount, and reads the user data D0 and D1 instructed to program by the host write commands W0 and W1 from the designated addresses of the RAM 136 sequentially (step S820). The data programming module 630 drives the flash I/F 139 to program the user data D0 and D1 into the flash module 150 sequentially (step S840). The content of the queues after the execution are shown in FIG. 12.

Figure 13:
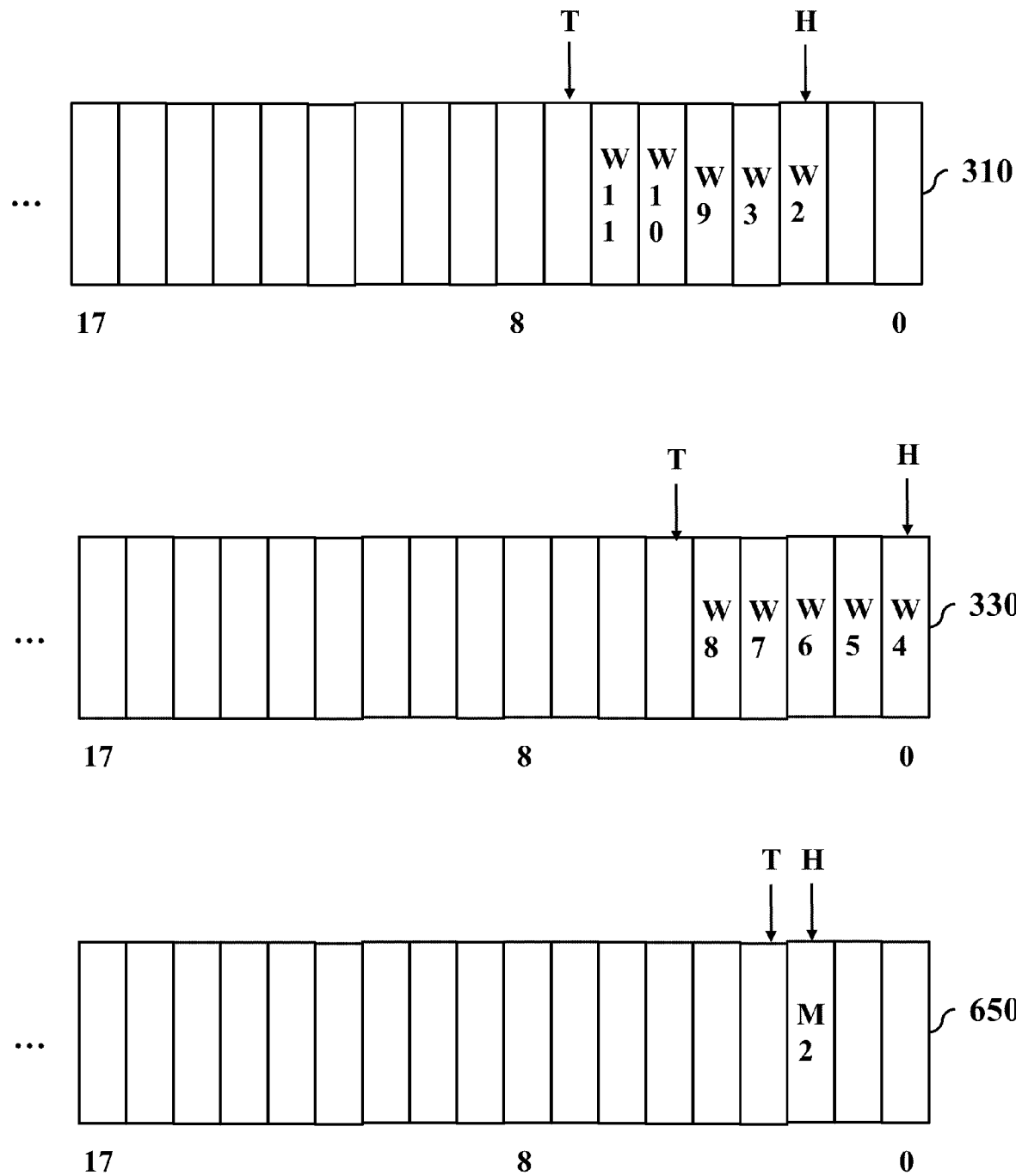

Subsequently, after receiving the host write command W11={LBA#4000~4499,D11} (step S710), the command scheduling module 610 detects that the logical address range LBA#4000~4499 carried in the host write command W11 does not conflict with any logical address range carried in the host write command of the SCQ 310 and any logical address carried in the host write command of the RCQ 330 (the "No" path of the step S720), and pushes the host write command W11 into the SCQ 310 (step S750). The content of the queues after the execution are shown in FIG. 13.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

Although the embodiment has been described as having specific elements in FIGS. 1-2, it should be noted that additional elements may be included to achieve better performance without departing from the spirit of the invention. Each element of FIGS. 1-2 is composed of various circuitries and arranged to operably perform the aforementioned operations. While the process flows described in FIGS. 7 and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A method for executing host write commands, performed by a processing unit of a flash controller, comprising:
   providing a sequential-write command queue (SCQ), a random-write command queue (RCQ) and a mark queue, wherein the SCQ stores a plurality of sequential write commands, the RCQ stores a plurality of random write commands, the mark queue comprises a record indicating that a conflicting sequential write command and/or a conflicting random write command needs to be processed in advance;

when a specific condition is met, obtaining a first logical address range carried in the conflicting sequential write command and second logical address ranges carried in the sequential write commands earlier than the conflicting sequential write command from the SCQ, and/or a third logical address range carried in the conflicting random write command and fourth logical address ranges carried in the random write commands earlier than the conflicting random write command from the RCQ according to content of the record;

reading user data of the first logical address range from a first address of a random access memory (RAM) and user data of the second logical address ranges from second addresses of the RAM, and/or user data of the third logical address range from a third address of the RAM and user data of the fourth logical address ranges from fourth addresses of the RAM; and programming the user data of the first logical address range and the second logical address ranges, and/or the user data of the third logical address range and the fourth logical address ranges into a flash module, wherein the specific condition is met during a time period between receptions of a first instruction and a second instruction from a host side, where the first instruction instructs the flash controller to enter a sleep mode or a power saving mode, and the second instruction instructs the flash controller to leave the sleep mode or the power saving mode.

2. The method of claim 1, wherein the specific condition is met when a total number of occupied nodes in the SCQ, the RCQ or the mark queue exceeds a threshold.

3. The method of claim 1, wherein the sequential write commands are queued in the SCQ in order from first to last based on reception times of the sequential write commands from a host side, and the random write commands are queued in the RCQ in order from first to last based on reception times of the random write commands from the host side.

4. The method of claim 1, wherein a length of a fifth logical address range carried in any sequential write command is greater than a threshold and a length of a sixth logical address range carried in any random write command is equal to or lower than the threshold.

5. The method of claim 4, wherein the threshold is set to 1.

6. A non-transitory computer-readable storage medium having stored therein program code that, when loaded and executed by a processing unit of a flash controller, causes the processing unit of the flash controller to:

provide a sequential-write command queue (SCQ), a random-write command queue (RCQ) and a mark queue, wherein the SCQ stores a plurality of sequential write commands, the RCQ stores a plurality of random write commands, the mark queue comprises a record indicating that a conflicting sequential write command and/or a conflicting random write command needs to be processed in advance;

when a specific condition is met, obtain a first logical address range carried in the conflicting sequential write command and second logical address ranges carried in the sequential write commands earlier than the conflicting sequential write command from the SCQ, and/or a third logical address range carried in the conflicting random write command and fourth logical address ranges carried in the random write commands earlier than the conflicting random write command from the RCQ according to content of the record;

read user data of the first logical address range from a first address of a random access memory (RAM) and user data of the second logical address ranges from second addresses of the RAM, and/or user data of the third logical address range from a third address of the RAM and user data of the fourth logical address ranges from fourth addresses of the RAM; and program the user data of the first logical address range and the second logical address ranges, and/or the user data of the third logical address range and the fourth logical address ranges into a flash module, wherein the specific condition is met during a time period between receptions of a first instruction and a second instruction from a host side, where the first instruction instructs the flash controller to enter a sleep mode or a power saving mode, and the second instruction instructs the flash controller to leave the sleep mode or the power saving mode.

7. The non-transitory computer-readable storage medium of claim 6, wherein the specific condition is met when a total number of occupied nodes in the SCQ, the RCQ or the mark queue exceeds a threshold.

8. The non-transitory computer-readable storage medium of claim 6, wherein the sequential write commands are queued in the SCQ in order from first to last based on reception times of the sequential write commands from a host side, and the random write commands are queued in the RCQ in order from first to last based on reception times of the random write commands from the host side.

9. The non-transitory computer-readable storage medium of claim 6, wherein a length of a fifth logical address range carried in any sequential write command is greater than a threshold and a length of a sixth logical address range carried in any random write command is equal to or lower than the threshold.

10. The non-transitory computer-readable storage medium of claim 9, wherein the threshold is set to 1.

11. The non-transitory computer-readable storage medium of claim 6, wherein the first address or the second address of the RAM is stored in the SCQ with each sequential write command, and the third address or the fourth address of the RAM is stored in the RCQ with each random write command.

12. An apparatus for executing host write commands, comprising:

a flash interface (I/F), coupled to a flash module;

a random access memory (RAM), arranged operably to: allocate space for a sequential-write command queue (SCQ), a random-write command queue (RCQ) and a mark queue, wherein the SCQ stores a plurality of sequential write commands, the RCQ stores a plurality of random write commands and the mark queue comprises a record indicating that a conflicting sequential write command and/or a conflicting random write command needs to be processed in advance; and a processing unit, coupled to the RAM and the flash I/F, arranged operably to: when a specific condition is met, obtain a first logical address range carried in the conflicting sequential write command and second logical address ranges carried in the sequential write commands earlier than the conflicting sequential write command from the SCQ, and/or a third logical address range carried in the conflicting random write command and fourth logical address ranges carried in the random write commands earlier than the conflicting random write command from the RCQ according to content of the record; read user data of the first logical address range from a first address of the RAM and user data of the second logical address ranges from second addresses of the RAM, and/or user data of the third logical address range from a third address of the RAM and user data of the fourth logical address ranges from fourth addresses of the RAM; and drive the flash I/F to program the user data of the first logical address range and the second logical address ranges, and/or the user data of the third logical address range and the fourth logical address ranges into the flash module, wherein the specific condition is met during a time period between receptions of a first instruction and a second instruction from a host side, where the first instruction instructs the apparatus to enter a sleep mode or a power saving mode, and the second instruction instructs the apparatus to leave the sleep mode or the power saving mode.

13. The apparatus of claim 12, wherein the specific condition is met when a total number of occupied nodes in the SCQ, the RCQ or the mark queue exceeds a threshold.

14. The apparatus of claim 12, wherein the sequential write commands are queued in the SCQ in order from first to last based on reception times of the sequential write commands from a host side, and the random write commands are queued in the RCQ in order from first to last based on reception times of the random write commands from the host side.

15. The apparatus of claim 12, wherein a length of a fifth logical address range carried in any sequential write command is greater than a threshold and a length of a sixth logical address range carried in any random write command is equal to or lower than the threshold.

16. The apparatus of claim 15, wherein the threshold is set to 1.

17. The apparatus of claim 12, wherein the first address or the second address of the RAM is stored in the SCQ with each sequential write command, and the third address or the fourth address of the RAM is stored in the RCQ with each random write command.

* * * * *